United States Patent Office 3,429,123
Patented Feb. 25, 1969

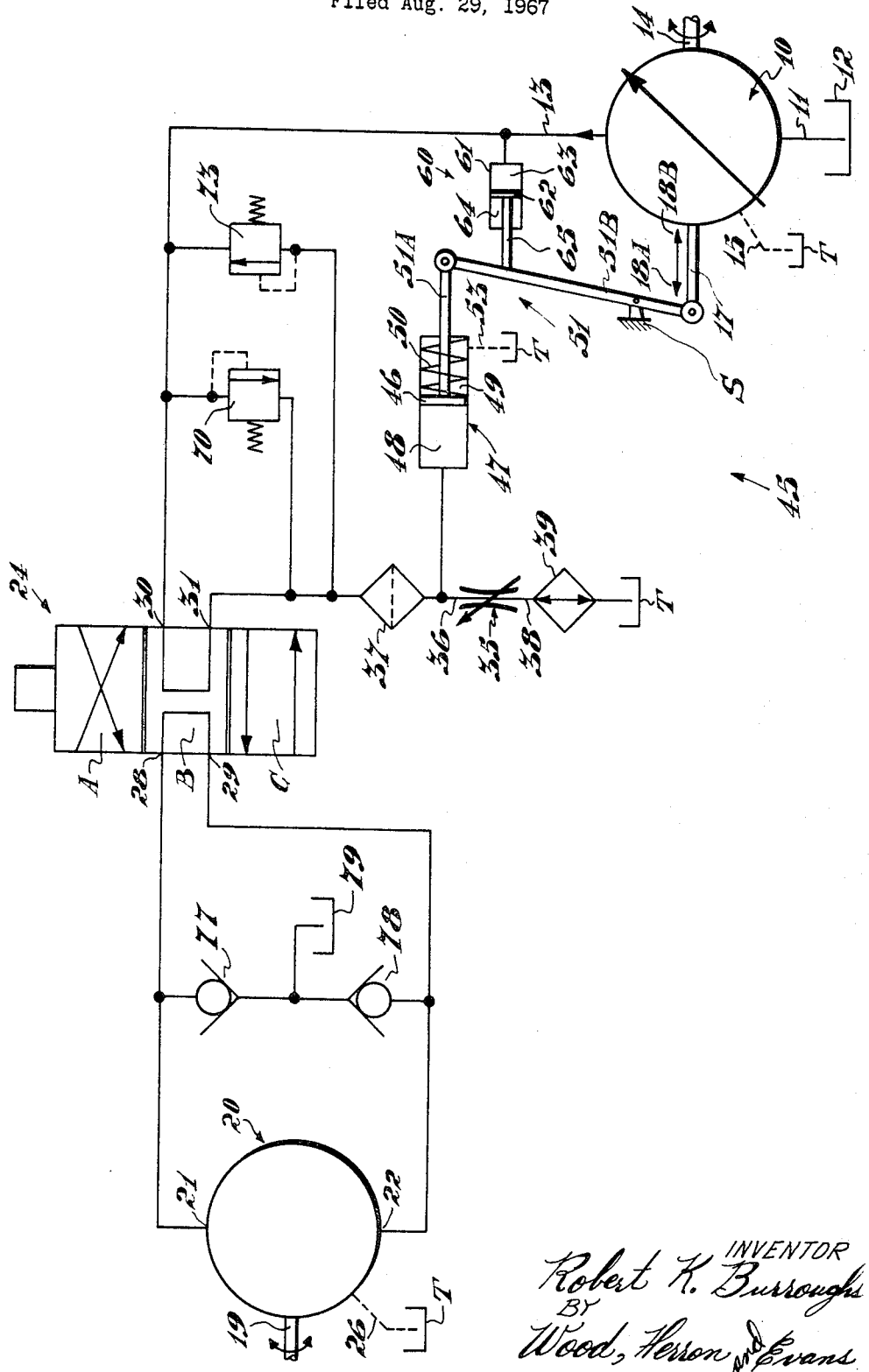

3,429,123
SPEED CONTROL SYSTEM
Robert K. Burroughs, Batavia, Ohio, assignor to R. K. Le Blond Machine Tool Company, Cincinnati, Ohio, a corporation of Delaware
Filed Aug. 29, 1967, Ser. No. 664,128
U.S. Cl. 60—53
Int. Cl. F16h 39/46, 39/50
8 Claims

ABSTRACT OF THE DISCLOSURE

A speed control system is disclosed including a pump having a movable control member for varying the pump output which is acted upon by a restoring force tending to resist movement, a fluid motor driven by the pump, and a feedback circuit acting on the control member for establishing and maintaining the motor speed at a constant value notwithstanding fluctuations in loading of the motor. The feedback circuit includes a variable orifice in the motor exhaust line and a movable feedback piston which exerts a force on the control member to maintain the pump output and motor speed at a value corresponding to the orifice setting. The piston force necessary to overcome the restoring force and move the pump control member is derived from a pair of oppositely directed forces acting on the piston which are each substantially larger than the restoring force exerted on the pump control member. The opposing forces are generated by using a large feedback piston having one face directly exposed to the upstream orifice pressure and another face acted upon by a spring having a large spring rate. Derivation of the piston force in this manner renders the feedback circuit relatively insensitive to the magnitude of the pump restoring force, thereby enabling the speed control system to be used, without adjustment, with different pumps exhibiting widely varying restoring force characteristics.

This invention relates to speed control systems and more particularly to speed control systems for use in conjunction with fluid motors.

In one typical type of hydraulic system for imparting rotational motion to a load, a fixed displacement fluid motor is connected to the load and hydraulically driven by the output of a pump. Control of the speed at which the fluid motor drives the load is accomplished by regulating the volumetric rate of flow of fluid pumped through the motor. Increasing the volumetric flow rate drives the load at a faster speed, while decreasing the volumetric flow rate drives the load at a slower speed. In many such hydraulic installations it has been found desirable to use electric motors to drive the pumps. Electric motors generally operate at a fixed speed. Thus, the changes in the output volumetric flow rate of the pump which are necessary to change the speed at which the fluid motor drives the load, must be produced by changing the displacement of the pump. Consequently, it has been the practice in prior art systems of this general type to utilize variable displacement pumps.

Variable displacement pumps generally have a selectively positionable movable control member for varying the displacement of the pump, and are of two general types depending upon whether the motion necessary for positioning the control member to change the displacement is rotational or translational and, hence, the motive effort acting on the control member in the form of a pure force or a torque. Illustrative of pumps falling into the first category are vane pumps in which changes in output are produced by the application of a translation-producing force to the movable control member. Illustrative of pumps falling into the second category are piston pumps in which changes in output are produced by the application of a rotation-production torque to the movable control member.

To position the movable member for controlling the displacement of the pump and, hence, the output volumetric flow rate and in turn the motor speed, the prior art proposals most usually have provided a feedback circuit. The feedback circuit includes a variable orifice positioned in the motor circuit, and a piston connected to the movable pump control member and responsive to the upstream orifice pressure. The orifice is located such that the pressure thereacross and, hence, the upstream orifice pressure, is correlated to the volumetric rate of flow through the motor. In such system, should the motor speed tend to decrease due to an increase in load, the pressure drop across the orifice decreases. This decrease in pressure drop is reflected as a decrease in upstream orifice pressure, and is utilized to move the piston and thereby alter the position of the pump control member in a manner such as to increase the pump output and restore the motor speed to the desired level. Similarly, should the load suddenly decrease, the motor speed tends to increase, causing the volumetric rate of flow of fluid through the orifice to increase. This increase in flow increases the pressure drop across the orifice. The increased orifice pressure drop is manifested as an increase in the upstream orifice pressure, and is utilized to reposition the piston and thereby alter the position of the pump control member, lowering the pump output and restoring the motor speed to the desired level.

One principal problem with the prior art feedback circuit proposals of the type described is that they are not universally applicable, without critical and time-consuming adjustments, in hydraulic drive systems having different types of variable displacement pumps. The control members of variable displacement pumps exhibit a certain resistance to movement which is in the nature of a restoring force tending to return the control member to the zero pump output position. The motive effort required to overcome this restoring force and move the control member, whether it be in the form of a pure force to produce translational motion of the control member or in the nature of a toque to produce rotational motion of the control member, varies from manufacturer to manufacturer and from pump to pump of a given manufacturer.

Consequently, feedback systems of the prior art designed for use with a pump of one type requiring a given motive effort to overcome the restoring force and move the control member for varying the pump displacement may not readily be adaptable for use in a hydraulic system having a pump exhibiting different restoring force characteristics and requiring a different motive effort to move the control member. To make the prior art feedback circuits adaptable for use with pumps requiring different motive efforts to moving the control member than that for which the feedback circuit was originally designed, it has been necessary to make structural and operational adjustments in the feedback circuit itself. This inflexibility is expensive and time-consuming and, therefore, undesirable.

It has been a primary objective of this invention to provide a feedback circuit for a hydraulic speed control system which is relatively insensitive to variations in the restoring force characteristics of the pump, and hence in the motive effort required to move the control member of the pump for varying its displacement. This objective has been accomplished in accordance with the principles of this invention by utilizing a fundamentally different concept in the design of a feedback system. This concept involves deriving the force exerted on the control member by the piston, which is necessary to overcome the pump restoring force, from a pair of substantially larger forces acting on the piston in opposite directions. The derivation of the piston force in this manner makes the feedback circuit substantially independent of the magnitude of the pump restoring force. Consequently, the feedback circuit can be utilized, without the need for structural modifications, in speed control systems having pumps with restoring force characteristics which vary over a wide range.

In one preferred form of this invention the substantially larger opposing forces are provided by combining a large piston having one face directly exposed to the upstream orifice pressure and another face acted upon by a spring having a high spring rate. In operation, the upstream orifice pressure applied directly to one face of the piston, by reason of the large piston size, produces a very large hydraulic feedback force. This feedback force is opposed by very large spring force generated by the spring acting upon the opposite face of the piston. The differential force produced by the oppositely directed feedback force and spring force is applied, via the piston, to the movable control member, and acts against the restoring force of the pump to position the control member as necessary to regulate the pump output and, hence, the motor speed.

While the force differential of the feedback force and the spring force at any given piston equilibrium point is equal and opposite to the restoring force exerted on the control member by the pump, the feedback force and the spring force when considered singly are each substantially larger than the restoring force. Thus, for a given magnitude feedback and spring force combination, variations in restoring force characteristics of different pumps are inconsequential from the standpoint of the resultant position of the piston and, hence, of the pump control member. With the piston position independent of the restoring force, the feedback circuit is useful, without adjustment, in speed control circuits having pumps with restoring forces varying over a wide range.

An important advantage of the feedback circuit of this invention attributable to the use of a spring having a large spring rate is that a hydraulic speed control system is provided which is characterized by having high gain. Such a system responds well to rapid changes in the upstream orifice pressure and is one which provides valuable anti-hunting properties.

A further advantage of the feedback circuit of this invention, attributable to the direct coupling between the piston and orifice, is that a fluid amplifier, such as a spool valve amplifier, used in many prior art systems to overcome the pump restoring force, is not required. This produces savings in initial equipment cost as well as maintenance, and improves reliability.

With many variable displacement pumps, the restoring forces acting on the movable pump control member are a function of not only the position of the control member, but also of the pressure of the fluid output from the pump. Since pump output pressure is in part dependent on the size of the load being driven, a restoring force dependent on pump pressure is in effect a function of the load size. With the restoring force dependent not only on the position of the control member but also on the size of the load, the net force exerted by the feedback circuit piston on the movable control member must be a function of not only control member position, but also load size. This double dependency of the feedback circuit net piston force on the size of the load driven by the motor, as well as on the position of the control member, obviously complicates the feedback circuit, making accurate speed control at low speeds difficult, and is undesirable for this reason.

It has been a further objective of this invention to provide a speed control system in which the net feedback piston force applied to the movable control member for varying the pump volumetric output is dependent on the size of the load driven by the motor. This objective has been accomplished in accordance with certain other principles of this invention by providing a compensating piston responsive to the pressure of the fluid output from the pump which applies compensating forces to the movable control member of a magnitude and in a direction such as to largely cancel changes in the restoring force induced by changes in the load size. Thus, by providing a compensating piston which largely cancels the effects of load size on the restoring force, a simpler feedback circuit which is essentially a function of only a single variable, namely, load speed, may be utilized in the speed control system.

Another problem which has existed with prior art speed control proposals is a tendency to produce cavitation when the pump output is suddenly reduced as occurs, for example, when the motor control circuit is in the process of stopping the motor. Cavitation causes eroding of pump components and high operating noise levels. When the pump output is suddenly reduced, the flow of fluid to the motor intake line decreases markedly. However, the motor continues rotating due to the inertia of the load. This causes the motor to function like a pump, and a vacuum is produced in the motor intake line. This vacuum produces cavitation and consequent erosion and noise. This later consequence, namely, noise, is becoming increasingly more important in industrial applications due to the tendency of local governments to restrict noise levels for the benefit and comfort of employees.

It has been an additional objective of this invention to provide a hydraulic speed control system in which cavitation is eliminated. This objective has been accomplished by providing a check valve in the motor intake line. The check valve is connected to allow replenishment fluid to flow into the motor intake line from a suitable source should a vacuum be created in the motor intake line when the pump output is decreased and inertial effects convert the motor to a pump.

It has been a further objective of this invention to provide a speed control system which limits the deceleration rate of the motor when the variable orifice is suddenly closed to arrest motion of the load, thereby preventing damage to system components due to the development of unduly high pressures occasioned by sudden stopping. This objective has been accomplished in a very simple manner in accordance with certain additional principles of this invention by providing a pressure relief valve in the output circuit of the motor at a point upstream of the variable orifice. The pressure relief valve limits to a safe value the maximum pressure which can be developed in the motor output line when the variable orifice is suddenly closed to arrest motor motion. Should the pressure in the motor exhaust line have a tendency to exceed the pressure for which the relief valve is set, fluid is drained from the motor output line.

Other objectives and advantages of this invention will be more readily apparent from a detailed description of the invention taken in conjunction with the accompanying drawing in which the figure discloses a schematic hydraulic circuit diagram of a preferred embodiment of the speed control system of this invention.

The preferred speed control system of this invention depicted in the figure includes a variable displacement unidirectional pump 10. The pump 10 may be of any suitable design, but preferably is of the type manufactured by Webster Company, designated Model No. C3L. This pump has a displacement of 1.81 cubic inches per revolution and is modified to include a stop converting it from bidirectional to unidirectional. The pump 10 has a conventional wobble plate or swash plate (not shown), the angle of which regulates the pump volumetric output in a manner well-known in the art and, therefore, not described in detail herein. The pump 10 further includes an intake line 11 connected to a source of fluid 12 and an output line 13. A rotatable shaft 14 driven by an electric motor (not shown) provides the necessary input power to the pump for providing pressure fluid in output line 13. A drain line 15 is connected to a tank T for permitting the pump housing to drain leakage fluid produced during pump operation.

A movable control member 17 is also associated with the pump 10. The control member 17 is integral or mechanically linked to the swash plate or wobble plate (not shown) of the pump, and when moved in the direction of arrows 18A and 18B applies a torque to the swash plate to alter the angle thereof in a manner such that the pump output on line 13 is increased and decreased, respectively. The control member 17 exhibits a certain resistance to movement as a consequence of the force applied thereto by the swash plate. This resistance to movement is herein termed the "restoring force," and is in a direction tending to return the control member to a portion corresponding to a zero pump output level.

The speed control system further includes a fixed displacement bidirectional hydraulic motor 20 having an output shaft 19 for rotatably driving a load (not shown). The motor 20 has a pair of ports 21 and 22 which alternatively function as intake and exhaust ports depending upon the position in which a conventional four-way valve 24, to be described, is placed. The fixed displacement hydraulic motor 20 may be of any suitable design and preferably is of the type manufactured by the Webster Electric Company, designated Model No. MC3F, having a displacement of 1.81 cubic inches per revolution. The motor 20 is provided with a drain line 26 connected to a tank T for permitting the motor housing to drain leakage fluid produced during motor operation.

The system, as noted earlier, includes a conventional four-way valve 24 for selectively variably interconnecting the motor 20 and pump 10. The valve 24 has an input port 30 to which pressure fluid is transmitted from the output line 13 of the pump 10, an output port 31 through which fluid is exhausted after having passed through the motor 20, and two ports 28 and 29 connected to motor ports 21 and 22, respectively, for conveying fluid between the motor and four-way valve. The four-way valve 24 has three separate and independent positions, A, B, and C, corresponding to the three flow patterns necessary for preventing, as well as providing, selectively-reversible drive of the motor 20. Specifically, four-way valve positions A and C correspond to opposite direction flow patterns through the four-way valve and motor 20 for producing bidirectional motor rotation. Position B corresponds to a flow pattern through the four-way valve 24 in which fluid from the pump 10 bypasses the motor 20 preventing the motor from being driven in either of its two reversible directions.

Control of the volumetric rate of flow of fluid through the motor 20 and, hence, control of output speed of the motor, is provided by a feedback circuit generally indicated by the reference numeral 45. The feedback circuit 45 includes a variable restrictor valve or orifice 35. The upstream side 36 of the variable orifice 35 is preferably connected to the output port 31 of the four-way valve 24 via a filter 37. The downstream side 38 of the variable orifice is preferably connected to a tank T via a liquid-to-air heat exchanger 39. The variable orifice 35 when opened and closed increases and decreases, respectively, the volumetric rate of flow of fluid through the motor 20 and, hence, the speed of the motor 20, in a manner to be described.

Both the filter 37 and the heat exchanger 39, included in the preferred embodiment, may be of any suitable design. In the preferred embodiment it has been found preferable to use a filter manufactured by the Schroeder Company designated Model No. TF 1—1 having a 25 micron filtering element, and to use a heat exchanger manufactured by the Young Company designated Model No. OH-27.

The feedback circuit 45 further includes a movable feedback piston 46 which is shiftable within a cylinder 47 to form two variable volume chambers 48 and 49. Chamber 48 is in direct hydraulic communication with the upstream side 36 of the variable orifice 35 and functions to subject the feedback piston 46 to a feedback force which is directly dependent upon the upstream pressure of the orifice, which in turn is directly dependent upon the volumetric rate of flow through the orifice, which in turn is dependent upon the speed of the motor 20. The magnitude of the feedback force decreases when the motor speed decreases as a consequence of the decreased volumetric flow through the motor 20 and, hence, through the orifice. Similarly, the feedback force increases when the speed of the motor 20 increases due to increased volumetric flow through the motor and, hence, through the orifice 35.

The feedback circuit 45 also includes a compression spring 50 positioned within the chamber 49. The spring 50 applies a spring force to the feedback piston 46, the spring force being dependent upon the degree to which the spring is compressed. Also included in the feedback circuit is a linkage 51 interconnecting the piston 46 and the control member 17 for transmitting motion of the piston to the control member. Linkage 51 preferably includes a link or piston rod 51A secured at one end to the piston 46, and a link 51B which is pivotally mounted at an intermediate point to a stationary support S and pinned at its ends to the link 51A and the control member 17. A drain line 53 connects chamber 49 to a tank T permitting leakage fluid to drain from chamber 47.

The relative size of the feedback piston 46 and the spring rate of spring 50 with respect to the restoring force exerted on the control member 17 by the pump 10 are critical to accomplishment of certain of the novel features of the speed control system of this invention. Specifically, the piston size and the spring rate must be selected such that, assuming there is no mechanical advantage afforded by the linkage 51, the feedback force developed by the upstream orifice pressure and the speed force developed by the spring 50 are each substantially larger than the restoring force applied to the control member 17 by the swash plate of the pump. By modifying the linkage 51 and thereby altering the mechanical advantage it provides, the size of the feedback piston 46 and the spring rate of spring 50 may be made to vary over a wide range while still permitting the critical relationship between the feedback and spring forces and the restoring force to be maintained. In practice, it has been found that for a given linkage 51 configuration and with the Webster pump 10 noted previously, the piston 46 and spring 50 preferably are sized to provide feedback and spring forces, respectively, which develop, when applied to the swash plate via the linkage 51 and control member 17, feedback and spring torques, respectively, which exceed, by a factor of at least thirty, the compensated restoring torque developed by the restoring force which is applied to the control member by the pump swash plate. The ratio between the feedback and spring torques and the restoring torque, while preferably approximately thirty, may be selected in accordance with the needs of the user, larger ratios being used where more regulation and higher frequencies of response are required and smaller ratios being used where less regulation and lower frequencies of response are desired.

With the feedback torque and the spring torque each substantialy larger than the restoring torque, for example, larger by a factor of thirty, the operating characteristics of the feedback circuit 45 are rendered substantially independent of the magnitude of the compensated restoring torque. This independence permits the feedback circuit 45 to be used without modification in speed control systems having pumps with restraining force characteristics which vary over an extremely wide range. In addition, the independence of the feedback circuit on restoring force renders the speed control system for a given pump insensitive to any random fluctuations in the size of the restoring force which may exist. Since the feedback torque and the spring torque are chosen to be substantiallly larger than the compensated restoring torque, changes in feedback torque or spring torque attributable to changes in the upstream pressure of the variable orifice induced by changes in load and, hence, speed of the motor 20 are, by comparison, so much larger than the restoring torque that changes in the restoring torque due to either the difference in the restoring force characteristics of different pumps or random variations in the restoring force of a given pump are rendered negligible.

In addition, with the feedback torque and spring torque each substantially larger than the compensated restoring torque, the gain of the feedback circuit 45 is large, causing the frequency response of the system to be correspondingly high, thereby preventing hunting from occurring when the load on the motor 20 varies at any given speed.

The restoring torque can be considered as having three components. One component of the restoring torque is correlated to the angle of the swash plate and, hence, to the volumetric rate of flow of the fluid on output line 13 of the pump 10. This component of the restoring torque increases with increased angle of the swash plate and, hence, with increasing output of the pump 10. The second component of the restoring torque is a function of the pressure of the fluid output from the pump 10 on line 13. This component of the restoring torque increases with increasing output pressure on line 13. The third component of the restoring torque is random, being attributable to sporadic changes in forces applied by the swash plate to the control member 17 unrelated to changes in swash plate angle or pump output fluid pressure.

To render the feedback circuit 45 insensitive to the component of the restoring torque which is attributable to the force applied on the control member 17 by the swash plate developed as a consequence of increase pressure of fluid output from the pump 10 on line 13, a compensator generally indicated by the reference numeral 60 is provided. The compensator includes a cylinder 61 within which is slideably positioned a compensating piston 62 which divides the cylinder 61 into two chambers 63 and 64. The chamber 63 is hydraulically connected to the output line 13 of the pump 10 and causes a compensating force to be developed by the compensating piston 62 which is transmitted to the feedback piston linkage 51 via an adjustable interconnecting linkage 65. The size of the compensating piston 62 is selected such that the hydraulic compensating force of the piston 62, when applied to the feedback piston linkage 51, produces a compensating torque which is approximately equal and opposite to the component of the restoring torque attributable to the force on the swash plate developed by the pressure of the fluid output from the pump on line 13, when the linkage 65 is adjusted for the particular type pump used in the system.

Thus, when the restoring torque increases as a consequence of an increase in pressure of the fluid output from the pump on line 13 a compensating force is developed by the piston 62 which, when applied to linkage 51, essentially cancels the increase in restoring torque. Similarly, when the total restoring torque decreases due to a decrease in the pressure of fluid output from the pump on line 13, the torque developed as a consequence of the compensating piston 62 decreases an equal amount, producing cancellation. Thus, changes in restoring torque attributable to variations in the pressure of the fluid output on line 13 from the pump 10 do not effect the torque which must be applied to the control member 17 by the feedback piston to alter the volumetric rate of flow output from the pump.

A pressure relief valve 70 is connected between the pump output line 13 and the output port 31 of the four-way valve 24. The pressure relief valve 70 protects the four-way valve 24 and the motor 20 should the output pressure of the fluid in line 13 from the pump 10 exceed a safe value. Such protection is obtained by bypassing the four-way valve 24 and motor 20. This allows a portion of the pump output to flow directly through the filter 37, orifice 35, and heat exchanger 39 to the tank T, thereby lowering the pressure in the four-way valve 24 and motor 20.

A pressure relief valve 73 is connected between the pump output line 13 and a point intermediate the upstream side 36 of the orifice 35 and the four-way valve output port 31. Valve 73 is provided to limit deceleration of the motor 20 to a safe value when the orifice 35 is suddenly closed, thereby avoiding the buildup of unduly high pressures in the motor exhaust line which may damage system components. In operation, should the pressure in the motor exhaust line 21 or 22 build up to an excessively high level when the orifice 35 is suddenly closed, motor exhaust fluid bypasses the variable orifice 35 and is returned to the motor 20 intake line via the four-way valve 24. This prevents the pressure in the motor exhaust line, which controls the braking forces applied to the motor, from reaching excessive values. Thus, system damage is avoided.

A pair of check valves 77 and 78 are connected, respectively, between the motor ports 21 and 22 and a source of fluid 79. The check valves 77 and 78 are connected such that fluid can flow only from the source 79 to the motor ports 21 and 22. The check valves 77 and 78 function to prevent cavitation in the motor 20 which results when the fluid connection between the motor intake line 21 or 22 and the pump output line 13 is interrupted. In operation, it is not uncommon, when the four-way valve is shifted to position B interrupting the connection between the pump 10 and the motor 20, for a vacuum in the motor intake line 21 or 22 to tend to develop. This results as a consequence of inertial effects which cause the motor 20 to continue driving the load, and thus function as a pump. If a vacuum in the motor intake line 21 or 22 is permitted to exist, cavitation results, producing not only damaging erosion to the motor 20, but also undesirably high operating noise levels.

Check valves 77 and 78 prevent a vacuum from developing when the motor 20 functions as a pump. If the motor 20 is rotating such that port 21 is the intake port, should the rate of flow of fluid in this port tend to decrease below the rate of flow of fluid through output motor port 22, fluid in the intake motor port 21 is replenished from the supply or source 78 via the check valve 77, preventing a vacuum from developing in the motor intake line. In like manner should the motor 20 be rotating such that port 22 is the intake port, check valve 78 replenishes fluid in the motor intake line preventing a vacuum from developing. Thus, cavitation and consequent motor erosion and noisy operation are avoided.

In operation, assuming the four-way valve 24 is in either position A or position C corresponding to one or the other of the rotational directions of motor 20, the speed of rotation of the motor 20 is established at a predetermined desired value by adjusting the opening of the variable orifice 35 to a value such that the flow of fluid through the orifice provides the necessary volumetric flow rate through the motor 20 to drive the fixed displacement motor at the desired speed. Should the load on the motor 20 suddenly increase tending to slow down the motor, the flow of fluid exhausting from the motor and, hence, the rate of flow exhausting from the four-way valve output port 31, momentarily decreases. This momentary decrease lowers the flow rate through the variable orifice 35, lowering the upstream orifice pressure. The reduced upstream orifice pressure is transmitted to the chamber 48 of the feedback circuit 45, producing a lower feedback force on the piston 46. The reduced feedback force permits the feedback piston 46 to move leftwardly under the action of spring 50. Motion of the feedback piston 46 is transmitted via the linkage 51 to the control member 17 associated with the swash plate of pump 10, causing the swash plate to be positioned in a manner such as to increase the volumetric rate of flow output from the pump on line 13. The increased volumetric rate of flow output from the pump 10 causes the speed of the fixed displacement motor 20 to increase once again to the level established by the orifice 35.

Should the load on the motor 20 suddenly decrease, the speed of the motor 20 tends to increase. The increased speed of motor 20 causes an increased rate of flow from the motor 20 through the exhaust port 31 of the four-way valve 24, in turn increasing the rate of flow through the variable orifice 35. The increased flow through the orifice 35 raises the upstream orifice pressure. This increase in upstream pressure is transmitted to the chamber 48 developing a larger feedback force which drives the feedback piston 46 to the right compressing the spring 50. Motion of the piston 46 is imparted to the control member 17 associated with the pump swash plate via the linkage 51, causing the swash plate to move to a position such that the volumetric output on line 13 from the pump 10 is reduced. This reduction in output from the pump 10 causes the speed of the motor 20 to be reduced to the level established by the setting of the variable orifice 35.

As indicated previously, a very important feature of the control system of this invention is the relative insensitivity of the feedback circuit 45 to the restoring force exerted on the feedback piston 46 by the pump swash plate. This feature is attributable to the fact that the compensated restoring torque developed by the restoring force which acts on the control member is substantially smaller than the torques developed by the feedback and spring forces acting in opposite directions on the feedback piston 46. Consequently, the speed control system of this invention may be utilized without modification with pumps of different manufacturers exhibiting restoring force characteristics varying over a wide range.

A further and very important advantage of this invention is that the insensitivity of the speed control system to the restoring force of the variable displacement pump is achieved without resorting to fluid amplification means, such as spool valve amplifiers, found in many of the feedback circuits of prior art automatic speed control systems. Such is attributable to the direct hydraulic coupling of the feedback piston 46 having a large face to the upstream side 36 of the orifice 35.

Having described the invention, what is claimed is:

1. A system for controlling the speed of a fluid motor comprising:
   a variable displacement fluid pump having an output connected to the input of said motor and further having a selectively positionable control member for varying the volumetric rate of flow at said output, said control member exhibiting a restoring force resisting positioning movement which increases with increased pump output, and
   a feedback circuit including
      (a) an orifice connected in the output line of said motor for providing a pressure differential thereacross correlated to the volumetric rate of flow of fluid through said motor,
      (b) a movable piston directly hydraulically connected to the high pressure side of said orifice for generating a feedback force correlated to said pressure differential,
      (c) a spring for applying a spring force to said piston in a direction opposite to said feedback force, said feedback and spring forces being substantially larger in magnitude than said restoring force for providing high gain and effectively rendering said feedback circuit insensitive to the magnitude of said restoring force, and
      (d) means for transmitting to said control member movement of said piston in response to the force differential of said spring and feedback forces for positioning said control member and regulating said pump output to maintain the speed of said motor at a constant level corresponding to the size of said orifice.

2. The system of claim 1 further including a check valve connected between said motor input and a source of fluid for enabling fluid to flow only from said source to said motor input, whereby fluid may be replenished in said motor input line and cavitation in said motor prevented when said motor operates as a pump due to inertial effects resulting after interruption of the connection between said motor input and pump output lines.

3. The system of claim 1 further including a movable compensator piston connected to said pump output line and mechanically connected to said control member for applying a variable compensating force thereto in response to pressure variations in pump output, to thereby compensate for and render said feedback circuit insensitive to variations in said restoring force induced by variations in the pressure of said pump output.

4. The system of claim 3 wherein said system further includes a check valve connected between said motor input and a source of fluid for enabling fluid flow only from said source to said motor input, whereby fluid may be replenished in said motor input line and cavitation in said motor prevented when said motor operates as a pump due to inertial effects resulting after interruption of the connection between said motor input and pump output lines.

5. The system of claim 1 wherein said orifice is variable and further including a pressure relief valve connected in the output line of said motor intermediate said motor and said orifice for limiting the deceleration of said motor when said variable orifice is reduced in size, thereby controlling the dynamic braking characteristics of said motor.

6. A hydraulic system comprising:
   a bidirectional fluid motor having first and second ports,
   a four-way valve,
   a variable displacement fluid pump having an output connected to said motor through said four-way valve and further having a selectively positionable control member exhibiting a restoring force resisting positioning movement which increases with increased pump output, and
   a feedback circuit including
      (a) a variable orifice connected to said motor through said four-way valve for providing a pressure differential thereacross correlated to the volumetric rate of flow of fluid through said motor,
      (b) a movable piston directly hydraulically connected to the high pressure side of said orifice for generating a feedback force correlated to said pressure differential,
      (c) a spring for applying a spring force to said piston in a direction opposite to said feedback force, said feedback and spring forces being substantially larger in magnitude than said restoring force for providing high gain and effectively rendering said feedback circuit insensitive to the magnitude of said restoring force, and
      (d) means for transmitting to said control member movement of said piston in response to the force differential of said spring and feedback forces for positioning said control member and regulating said pump output to maintain the speed of said motor at a constant level corresponding to the size of the said orifice.

7. In a hydraulic system including a fluid motor, a variable displacement pump having an output connected to the input of said motor and further having a selectively positionable control member exhibiting a resistance to movement for varying the volumetric rate of flow at said output, and an orifice connected in the output line of said motor for providing a pressure differential thereacross correlated to the volumetric rate of flow of fluid through said motor, the improvement comprising:
- a movable means responsive to the pressure of the upstream side of said orifice for generating a feedback force correlated to said upstream pressure,
- bias means for applying a bias force to said movable means in a direction opposite to said feedback force, and
- means for transmitting to said control member movement of said movable means in response to the force differential of said spring and feedback forces for positioning said control member and regulating said pump output to maintain the speed of said motor at a constant level corresponding to the size of said orifice, said transmitting means being dimensioned such that the respective mechanical efforts of said bias and movable means applied to said control means to overcome said resistance are each substantially larger than said resistance.

8. The system of claim 3 wherein said compensator piston and said control member are connected through a linkage having a variable mechanical advantage.

References Cited
UNITED STATES PATENTS

| | | |
|---|---|---|
| 2,238,061 | 4/1941 | Kendrick. |
| 2,582,556 | 1/1952 | Morey _____ 60—53 |
| 2,892,311 | 6/1959 | Van Gerpen. |
| 2,892,312 | 6/1959 | Allen et al. |
| 3,125,324 | 3/1964 | Vivier _____ 60—53 XR |

EDGAR W. GEOGHEGAN, *Primary Examiner.*

U.S. Cl. X.R.

60—52; 103—11